Figure 5:
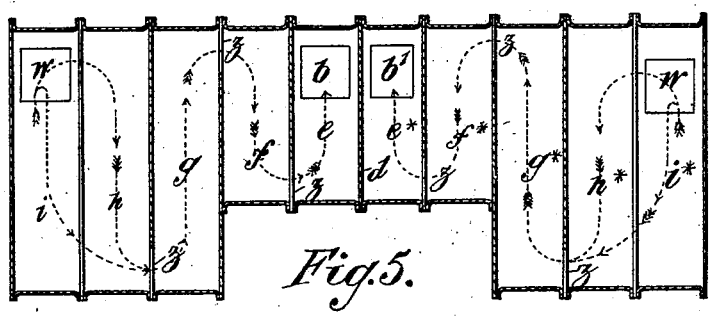

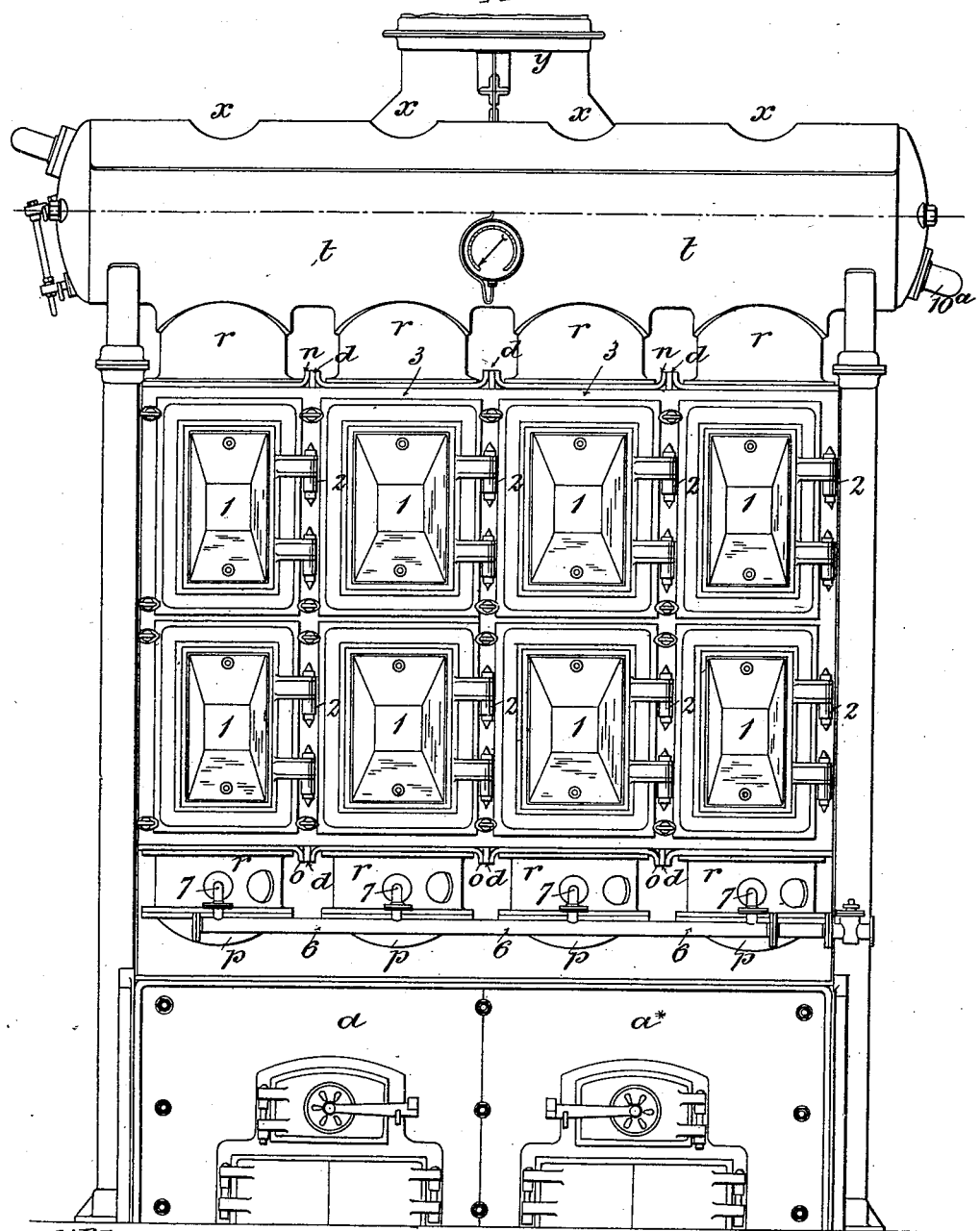

No. 714,085. Patented Nov. 18, 1902.
W. A. WOODESON.
STEAM BOILER.
(Application filed Apr. 5, 1902.)
(No Model.) 5 Sheets—Sheet 2.
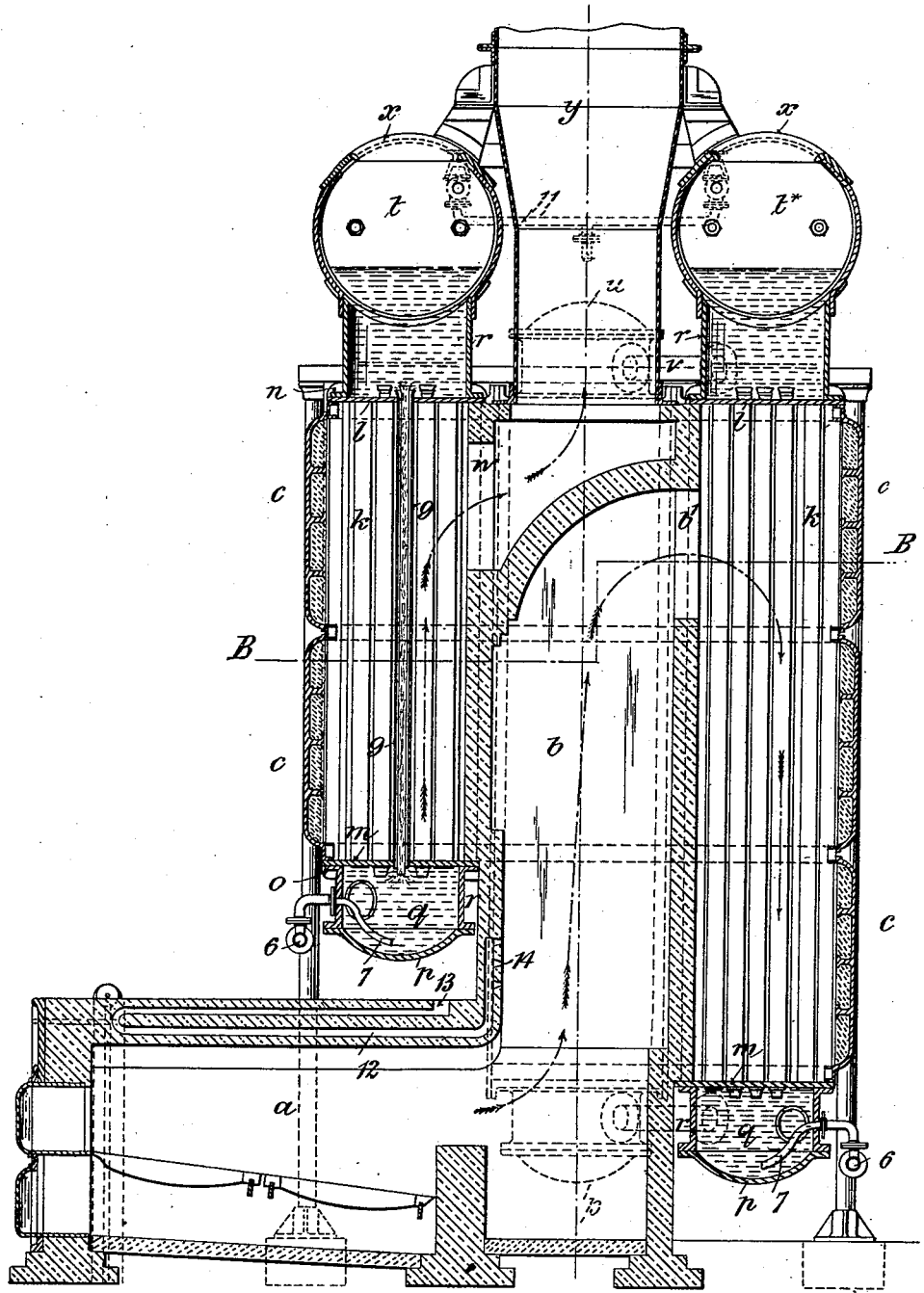
Witnesses
Inventor

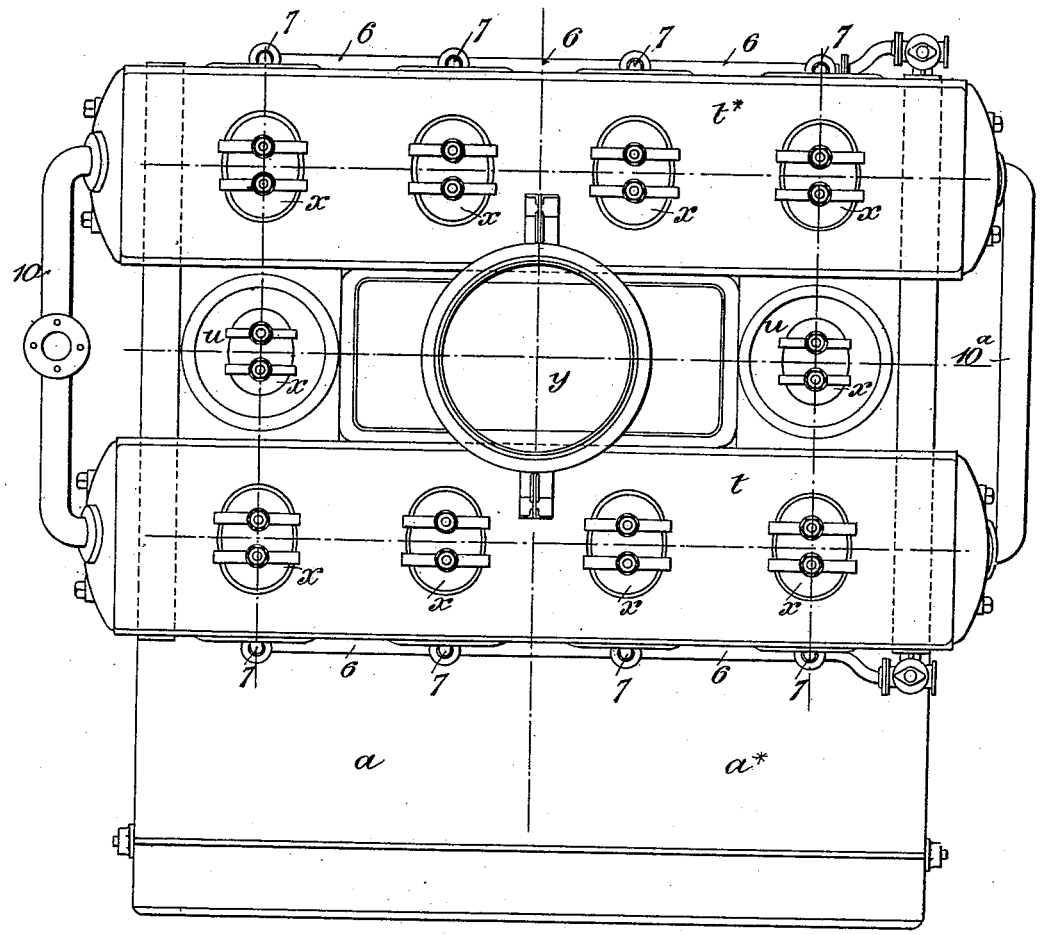

No. 714,085. Patented Nov. 18, 1902.
W. A. WOODESON.
STEAM BOILER.
(Application filed Apr. 5, 1902.)
(No Model.) 5 Sheets—Sheet 4.
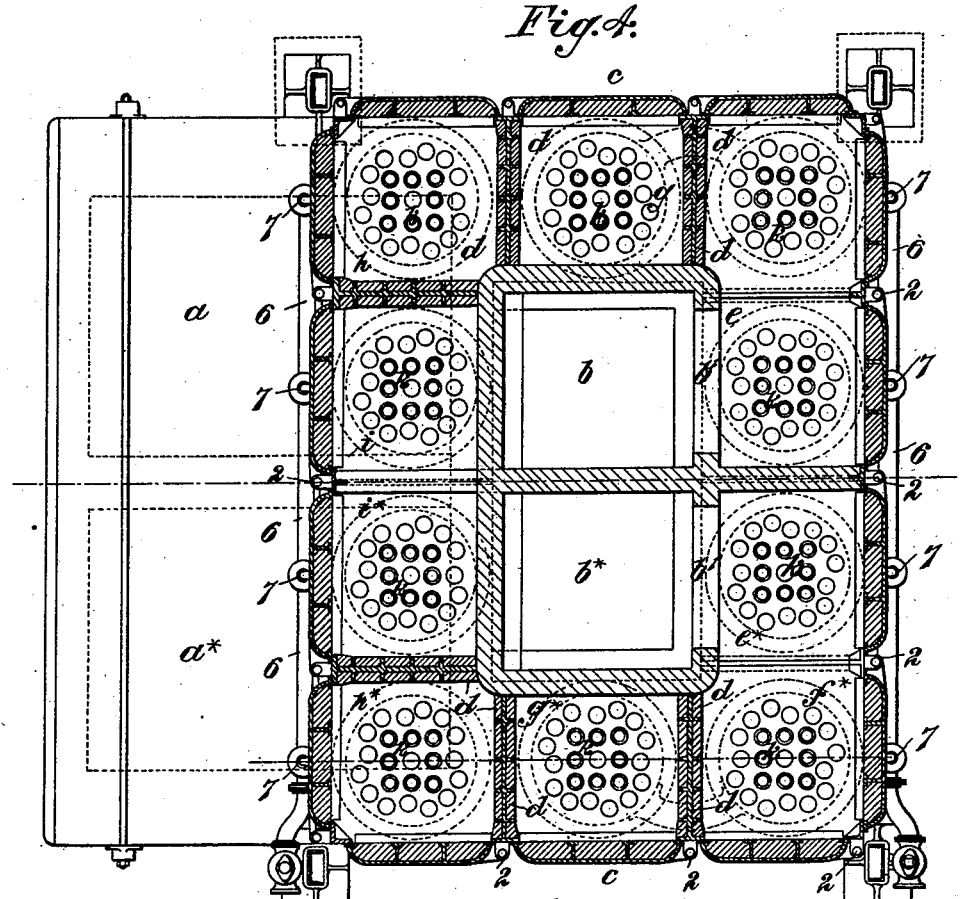
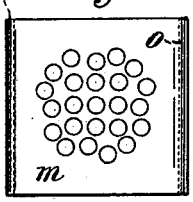
Witnesses
Geo. E. Frech.
E. P. Wright Jr.
Inventor
W. A. Woodeson,
By A. S. Pattison, atty No. 714,085. Patented Nov. 18, 1902.
W. A. WOODESON.
STEAM BOILER.
(Application filed Apr. 5, 1902.)

(No Model.) 5 Sheets—Sheet 5.

Witnesses
Geo. E. Frech,
C. P. Wright Jr.

Inventor
W. A. Woodeson,
By A. S. Pattison
atty.

UNITED STATES PATENT OFFICE.

WILLIAM ARMSTRONG WOODESON, OF GATESHEAD, ENGLAND, ASSIGNOR TO HIMSELF AND CLARKE, CHAPMAN AND COMPANY, LIMITED, OF GATESHEAD, DURHAM COUNTY, ENGLAND.

STEAM-BOILER.

SPECIFICATION forming part of Letters Patent No. 714,085, dated November 18, 1902.

Application filed April 5, 1902. Serial No. 101,486. (No model.)

*To all whom it may concern:*

Be it known that I, WILLIAM ARMSTRONG WOODESON, a subject of the King of Great Britain and Ireland, residing at Gateshead-on-Tyne, in the county of Durham, England, have invented Improvements in Steam-Boilers, of which the following is a specification.

This invention has reference to water-tube steam-boilers of the kind described in the specification of another application for Letters Patent, Serial No. 101,485, filed April 2, 1902, wherein the furnace is provided with an upwardly-extending combustion-chamber surrounded by an outer casing, the space between being divided by partitions into a number of compartments in each of which is a steam-generating element comprising water-tubes whose ends are fixed in tube-plates, a water-chamber below the lower tube-plate and a water-space above the upper tube-plate, the arrangement being such that the products of combustion are compelled to take a long course before leaving the heating-surface of the boiler, so that a large proportion of their heat will be transmitted to the water before they finally pass into the uptake or chimney. Now in such boilers, according to the present invention, the course of the gases is different. The connections of the elements with the steam or steam-and-water drum or drums and the arrangement of the said drum or drums is altered. The form of the boilers may be rectangular in plan, as also may be that of the combustion-chambers, of which there may be one or more, and the element-containing compartments surrounding it or them and various other improvements or modifications are introduced, as will be hereinafter described, and particularly specified in the claims of this specification.

Referring to the accompanying drawings, Figure 1 is a front elevation of one arrangement of boiler according to this invention. Fig. 2 is a vertical section on the line A A, Fig. 1. Fig. 3 is a plan, and Fig. 4 a horizontal section, on the line B B. Fig. 5 is a diagram illustrating a development of the series of element-containing compartments, and Figs. 6 and 7 are detail views at right angles to each other of one of the tube-plates of an element. Figs. 8, 9, and 10 are diagrammatic plans of modified arrangements of steam-boilers according to this invention.

In the arrangement illustrated, $a\ a^*$ are two furnaces, which may be of any convenient type and arranged side by side, as shown, and $b\ b^*$ are two combustion-chambers, one for each furnace, each rectangular in plan and each communicating at its front lower end with its respective furnace. The furnaces and the combustion-chambers may be suitably built of or lined with brickwork.

$c$ is a rectangular outer casing surrounding the combustion-chambers, and $d$ represents the partitions which divide the space between into a number of rectangular compartments $e\ f\ g\ h\ i$ and $e^*\ f^*\ g^*\ h^*\ i^*$.

In the example illustrated there are four short element-containing compartments $h$, $i$, $h^*$, and $i^*$, arranged in a row transversely over the rear ends of the furnaces $a\ a$, and behind this row and parallel thereto is another row of four long element-containing compartments, the space between these two rows being occupied by the combustion-chambers $b\ b$ and two long elements, one at each end.

$k\ k$ are the water-tubes, those of each element being fixed at the ends in an upper tube-plate $l$ and a lower tube-plate $m$. The tube-plates $l$ are formed with upwardly-extending flanges $n$ and the tube-plate $m$ with downwardly-extending flanges $o$, and to these flanges $n$ and $o$ are bolted the partitions $d$, which extend the whole height of the water-tubes and are covered with refractory material.

The upper and lower tube-plates $l$ and $m$ of the several elements are of such a shape as to form the tops and bottoms of the compartments and have flanges $n$ and $o$, which extend upwardly and downwardly, respectively, and between the flanges of adjacent elements, which are separated by a partition $d$, the partition is bolted, the bolts also serving to secure the various elements together. Where there is no partition between adjacent elements, the adjacent flanges are bolted together. The tubes $k$ are conveniently arranged in concentric circular rows or in bundles. Upper and lower water-spaces $s$ and $q$ at the ends of each element are formed by short cylinders or tubes $r$, each fixed by riveting or bolting at one end to its tube-plate around the water-tubes $k$. The lower water-spaces $q$ are provided with dished or inverted-dome-shaped covers or closures $p$, and sludge-pipes 7, which are or may be connected to drain-pipes 6 6, common to a number of them, extend through the walls $r$ of the said lower water-spaces and dip to the bottoms thereof. Upon and communicating with the upper ends of the cylinders or tubes $r$ at the top of the front row of elements is a steam or steam-and-water drum $t$, and a similarly-arranged drum $t^*$ is provided for the rear row.

The water-spaces $q$ of the elements $g$ and $g^*$ which are not beneath a drum are closed by dished or dome-shaped covers $u$, and both the spaces $q$ and $s$ of the said elements are connected by pipes $v$ to one or more adjacent elements. The covers $p$ and $u$ can be removed without interfering with the pipes $v$ and 7, thus enabling the elements to be readily and quickly opened and closed as required.

In the drums $t$ and $t^*$, opposite the several elements below them, manholes $x$ with covers are formed, so as to enable all the tubes of the said elements to be readily examined, cleaned, or removed and replaced without displacing the elements. The covers $u$ may also be formed with manholes $x$, fitted with covers.

At their rear upper ends the combustion-chambers $b$ $b^*$ are formed with openings $b'$ $b'$, and one of the partitions $d$ extends from between the said openings $b'$ $b'$ between the two middle elements $e$ $e^*$ to the outer casing. This is the only partition between elements of the back row; but between each two of the remaining elements there is a partition. The compartments $i$ and $i^*$ are connected by a passage $w$ to the uptake or chimney $y$. Each partition $d$, with the exception of the partitions between the elements $e$ and $e^*$ and $i$ and $i^*$, has an opening $z$, the said openings in the partitions $d$ being so disposed alternately top and bottom as to cause the gases to take a zigzag course up and down through several compartments, around and between the water-tubes $k$, the gases from the one combustion-chamber $b$ turning to the left and after traversing the five elements $e, f, g, h,$ and $i$ escaping to the uptake or chimney $y$ over the top of the said combustion-chamber $b$ through the passage $w$. The gases from the other combustion-chamber $b^*$ turn to the right and traverse in a similar manner the other elements $e^*, f^*, g^*, h^*,$ and $i^*$. With such a construction of boiler it will be seen that the gases have an opportunity of being more completely consumed than is usual, and the products of combustion travel in contact with such a length of heating-surface that a large proportion of their heat is transmitted to the water. The outer wall of each of the compartments may be in the form of or provided with doors 1 1, which may be of wrought or cast iron and are hinged to lugs 2 on the partition $d$, as shown in Fig. 4, and secured at top and bottom to channel-bars 3, extending around the row of compartments. The doors 1 1 are covered on the inside with refractory material. Instead of hinged doors removable panels may be used.

By means of the manholes $x$, covers $p$ and $u$, and doors 1 1 the various parts of the boiler are rendered accessible for cleaning, repairing, &c.

For the purpose of providing for circulation some of the water-tubes $k$ of each element are fitted with internal tubes 9 of smaller diameter, which act as downcomers. In some cases all the tubes $k$ of some or all of the elements may be provided with internal downcomer-tubes 9. By this construction each element is complete in itself, with the proper proportion of downcomer-tube area to upcomer-tube area to insure proper circulation, and can as a whole be bolted in place.

The arrangement and number of the elements may be varied by increasing the number of elements either in the front and rear rows or between them.

The steam or steam-and-water drums are or may be connected by the steam-pipe 10 and by a pipe $10^a$ below the water-level. 11 is the feed-water pipe, which also connects the drums.

For the purpose of promoting thorough combustion the roof or wall of the furnace or furnaces $a$ $a^*$ may be formed with sinuous or other passages 12, open to the atmosphere at one end 13 and terminating at the other in a series of openings or ports 14 in the wall of the combustion chamber or chambers $b$ $b^*$.

The lower water-spaces $q$ may be formed with hand-holes.

The more complete combustion of the gases and transmission of their heat to the water aimed at is assisted by allowing the gases leaving each upwardly-extending combustion-chamber to expand into the space occupied by two elements and then to travel through the spaces occupied by single elements, as in the arrangement illustrated.

Various modifications may be made and some of my improvements may be employed without others. Thus the gases may be allowed to expand into the space occupied by more than two elements on leaving each combustion-chamber. They may also be allowed to again expand into a similar space or spaces before reaching the chimney. In some cases the two streams of gases may meet in an element-containing compartment. Sometimes the shape of the compartments may also be varied to suit requirements.

By way of example, Fig. 8 illustrates an arrangement approximately square in plan in which the gases pass from a double combustion-chamber $b$ $b^*$ into the top of a compartment $e$, containing two elements, then turn to right and left through compartments $f$ $f^*$ $g\ g^*\ h\ h^*\ i\ i^*$ to a compartment $j$, containing two elements, and wherein the two streams of gases meet, passing thence to the funnel.

Fig. 9 illustrates an arrangement in which the gases leave the top rear part of each of the combustion-chambers $b\ b^*$, entering compartments $e\ e^*$, each containing three elements, and passing thence through the compartments $f f^*\ g\ g^*\ h\ h^*\ i\ i^*$, each containing two elements, the two streams of gases afterward meeting in the compartment $j$, which also contains two elements. In this construction there are three drums $l$.

Fig. 10 illustrates an arrangement approximately triangular in plan which is convenient in some cases where space is limited. The combustion-chamber $b$ is common to both furnaces, and the gases flow thence right and left into and downwardly through compartments $e\ e^*$ and in the reverse direction through compartments $f f^*$, each of the compartments $e, e^*, f$, and $f^*$ containing two elements, down through the compartments $g\ g^*$, each containing a single element, and meet in the lower part of a compartment $h$, which contains two elements, passing thence to the funnel.

In some cases a baffle or damper (not shown) may be arranged to control the orifices $b'\ b'$ in the walls of the combustion-chamber and leading into the first compartment $e\ e^*$, so as to regulate the flow and supply of gases from the furnaces to the compartments, this baffle or damper being actuated from the outside.

The baffles or partitions $d$ (shown in the drawings) are castings lined with refractory material and bolted at top and bottom to the flanges of the tube-plates; but they may consist of walls built up of ordinary fire-bricks or quarls and resting on the bottom tube-plates. Where orifices are required at the top, the necessary space is left, and where orifices are required at the bottom arches are built to form these orifices and the wall continued up to the top tube-plate. In such cases the tube-plates can be bolted direct to each other or distance-pieces can be fitted between the tube-plate flanges before they are bolted together.

What I claim is—

1. In a water-tube steam-boiler, the combination of a furnace, a combustion-chamber communicating therewith, two series of upright compartments, those of each series being connected alternately top and bottom, a communication between one of the compartments of each series and the furnace, another compartment of each series having a smoke-outlet, and a steam-generating element, in each of said compartments, as set forth.

2. In a water-tube steam-boiler, the combination of a furnace, a combustion-chamber communicating therewith, two series of upright compartments connected alternately top and bottom, a communication between one of the compartments of each series and the combustion-chamber, another compartment of each series having a smoke-outlet, a bundle of water-tubes within each of said compartments, water-chambers communicating through said tubes, upper and lower tube-plates respectively forming the tops and bottoms of the said compartments and the bottoms and tops of said water-chambers, as set forth.

3. In a water-tube steam-boiler, the combination of a furnace, an upwardly-extending combustion-chamber communicating therewith, two series of upright compartments arranged to surround said combustion-chamber and those of each series connected alternately top and bottom, a communication between one of the compartments of each series and the combustion-chamber, another of the compartments of each series having a smoke-outlet, a steam-generating element within each of said compartments, as set forth.

4. In a water-tube steam-boiler, the combination of a double furnace, two upwardly-extending combustion-chambers one communicating with each part thereof, a casing surrounding said combustion-chamber, partitions extending across the space between said combustion-chamber and casing and dividing said space into two series of upright compartments, those of each series being connected alternately top and bottom, a communication between a compartment of each series and a combustion-chamber, another compartment of each series having a smoke-outlet, a steam-generating element within each of said compartments, as set forth.

5. In a water-tube steam-boiler, the combination of a furnace, a combustion-chamber communicating therewith, two series of upright compartments those of each series being connected alternately top and bottom, a communication between a compartment of each series and the combustion-chamber, another compartment of each series having a smoke-outlet, a steam-generating element within each of said compartments, and a steam-and-water drum communicating with the upper parts of said elements, as set forth.

6. In a water-tube steam-boiler, the combination of a furnace, a combustion-chamber communicating therewith, two series of upright compartments those of each series being connected alternately top and bottom, a communication between a compartment of each series and the combustion-chamber, another compartment of each series having a smoke-outlet, a steam-generating element, within each of said compartments, and two steam-and-water drums each connected to the upper parts of some of the generating elements of each series, as set forth.

7. In a water-tube steam-boiler, the combination of two furnaces, two upwardly-extending combustion-chambers each communicating with a furnace, a casing surrounding said combustion-chambers, partitions extending across the space between said combustion-chambers and casing and dividing said space into two series of upright compartments those of each series connected alternately top and bottom, a communication between one compartment of each series and its respective combustion-chamber, another compartment of each series having a smoke-outlet, a bundle of water-tubes within each of said compartments, water-chambers communicating through said tubes, upper and lower tube-plates respectively forming the tops and bottoms of the said compartments and the bottoms and tops of said water-chambers, said tube-plates being formed with flanges adapted to have the edges of the partitions bolted between them, and two steam-and-water drums each connected to the upper parts of some of the generating elements of each series, as set forth.

8. In a water-tube steam-boiler, the combination of a furnace and a combustion-chamber of refractory material, a communication between them, steam-generating elements, compartments within which said elements are located and through which the gases flow and air-passages in said refractory material and communicating with the atmosphere and with the combustion-chamber, as set forth.

9. In a water-tube steam-boiler, the combination of a furnace, an upwardly-extending combustion-chamber communicating therewith, an outer casing concentrically surrounding same, partitions extending across the space between said combustion-chamber and casing and dividing said space into two series of upright compartments, those of each series being connected alternately top and bottom, a communication between the combustion-chamber and of two adjacent compartments, one belonging to each series, two other adjacent compartments, also one of each series, having smoke-outlets, and a steam-generating element in each compartment, as set forth.

10. In a water-tube steam-boiler, the combination of a furnace, an upwardly-extending combustion-chamber communicating therewith, an outer casing surrounding same, partitions extending across the space between said combustion-chamber and casing and dividing said space into upright compartments, connected alternately top and bottom and some of greater capacity than others, a communication between one of said compartments and the combustion-chamber, another of said compartments having a smoke-outlet, a steam-generating element within each of said compartments, as set forth.

11. In a water-tube steam-boiler, the combination of a furnace, an upwardly-extending combustion-chamber communicating therewith, an outer casing surrounding same, partitions extending across the space between said combustion-chamber and casing and dividing said space into two series of upright compartments, those of each series being connected alternately top and bottom, a communication between a compartment of each series and the combustion-chamber, another compartment of each series having a smoke-outlet, a steam-generating element in each compartment and a steam-and-water drum communicating therewith, some of the gases passing through the compartments of one series in succession and the remainder of the gases through those of the other series in succession, substantially as described.

12. In a water-tube steam-boiler, the combination of a furnace, series of upright compartments connected alternately top and bottom, a communication between one compartment of each of said series and the furnace, another compartment of each of said series having a smoke-outlet, and a steam-generating element in each compartment, as set forth.

13. In a water-tube steam-boiler, the combination of a furnace, a rectangular upwardly-extending combustion-chamber communicating directly therewith, a series of upright rectangular compartments connected alternately top and bottom, a communication between one of said compartments and the combustion-chamber, another of said compartments having a smoke-outlet, and a steam-generating element in each compartment, as set forth.

14. In a water-tube steam-boiler, the combination of a furnace, a rectangular upwardly-extending combustion-chamber communicating therewith, series of upright rectangular compartments connected alternately top and bottom, a communication between one compartment of each of said series and the furnace, another compartment of each of said series having a smoke-outlet, and a steam-generating element in each compartment, as set forth.

Signed at Gateshead, in the county of Durham, England, this 19th day of March, 1902.

WILLIAM ARMSTRONG WOODESON.

Witnesses:
ARCH. ROXBURGH,
THOS. HENDERSON.